United States Patent [19]
Bauer et al.

[11] 3,926,680

[45] Dec. 16, 1975

[54] PRIMARY MAGNESIUM ELEMENT

[75] Inventors: Jakob Bauer, Ellwangen; Winfried Krey, Neunheim, Kr. Aalen, both of Germany

[73] Assignee: Varta Batterie AG, Germany

[22] Filed: Jan. 21, 1974

[21] Appl. No.: 435,191

[30] Foreign Application Priority Data
Jan. 19, 1973   Germany............................ 2302469

[52] U.S. Cl.............. 136/154; 136/96; 136/100 M; 136/104; 136/155
[51] Int. Cl.² .......................................... H01M 6/04
[58] Field of Search... 136/154, 96, 98, 104, 100 M, 136/155

[56] References Cited
UNITED STATES PATENTS

| | | | |
|---|---|---|---|
| 2,612,533 | 9/1952 | Blake............................ | 136/154 X |
| 2,616,940 | 11/1952 | Reid.............................. | 136/155 X |
| 2,814,663 | 11/1957 | Rubin............................ | 136/154 X |
| 2,901,522 | 8/1959 | Bopp............................. | 136/154 X |

Primary Examiner—Patrick P. Garvin
Assistant Examiner—John F. Niebling
Attorney, Agent, or Firm—Weiser, Stapler & Spivak

[57] ABSTRACT

An electrolyte for a primary battery which is buffered with respect to its chromate ions by containing concurrently $Ba^{++}$-, $Sr^{++}$-, $SO_4^{--}$-, and $_4^{--}$ions, which ions are in equilibrium with the corresponding solid phase substances $BaCrO_4$, $BaSO_4$, and $SrSrO_4$.

7 Claims, No Drawings

PRIMARY MAGNESIUM ELEMENT

The invention relates to a magnesium element with a positive manganese dioxide electrode. As electrolyte (contained in the battery) for the positive electrode there are used conventional solutions of salts of alkali or alkaline earth metals in water. Preferably, solutions of magnesium bromide and magnesium perchlorate are utilized. As inhibitor such solutions contain chromate ions whereas in the manganese dioxide mass a low-solubility chromate is present. A typical mass includes for example, the following materials:

56% Manganese dioxide, 6% carbon black
35% $Mg(ClO_4)_2$ (with soluble chromate added)
2,5% $BaCrO_4$, and 0.5% MgO The addition of a certain quantity of a soluble chromate to the electrolyte is necessary in order to impart sufficient corrosion protection to the magnesium which is unstable in aqueous solutions, so as to achieve good storage life. On the other hand, the time delay $V_t$ (measured in seconds) between the time of connection of the element to an electric circuit and that at which the element reaches an operating potential of one volt, increases with increasing chromate concentration, this being referred to as delayed action time.

For additional description of conventional battery system, reference may be made to *The Encyclopedia of Electrochemistry*, Editor Clifford A. Hampel, Reinhold Publishing Corporation, New York, (1964) page 65 and seq., which is incorporated herein by reference.

From U.S. Pat. No. 2,547,907 issued Jan. 27, 1949; the following data is available.

Electrolyte: 300 g $MgBr_2.6\ H_2O$ per liter of water
Anode: Magnesium alloy (Al 3%, Zn 1%) with Fe <0.002% Ni <0.001%
Cathode: 90% $MnO_2$ + 10% acetylene-black

| $(NH_4)_2CrO_4$ (g/l) | $V_t$(sec) |
|---|---|
| 0.0 | 0.0 |
| 1.0 | 2.0 |
| 2.0 | 3.0 |
| 5.0 | 5.3 |
| 10.0 | 10.0 |

In practice an excessive delayed action time is undesirable because no battery electrical supply is available during that period. A compromise should therefore be made, and a chromate ion concentration should be selected which is as low as possible, while still providing adequate corrosion protection, but also keeping the delayed action time at a value as small as possible. In an article published by R. S. Kirk, P. F. George and A. B. Fry, in the *Journal of the Electrochemical Society*, Volume 99, pages 323 (1952) a concentration of 0.20g $Li_2CrO_4/1$ (=0.18g $CrO_4^{--}/1$) was determined to constitute the optimal value.

The inhibitor action depends upon the chromate ion concentration, whereas the cation plays a secondary role. Hence, other soluble alkaline chromates can, for example, be used in place of $Li_2CrO_4$, like potassium or sodium chromates.

However, the problem is further complicated because the chromate ion concentration produced in the electrolyte by a soluble chromate does not remain constant. During discharge of an element pursuant to the equation

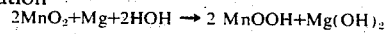
$2MnO_2+Mg+2HOH \rightarrow 2\ MnOOH+Mg(OH)_2$ $Mg(OH)_2$ is also formed as a product of reaction and precipitates out while chromate ions are coprecipitated through absorption. To obtain a fresh supply of chromate ions it is customary to add to the element a low-solubility chromate alloy such as $BaCrO_4$, $ZnCrO_4$ or $PbCrO_4$. Each of these compounds is in an equilibrium in the solution which is determined by the solubility product.

It has then been found that none of the compounds in question have a solubility product which permits establishing the chromate ion concentration which is considered optimal for galvanic elements having long shelf life. Closest to the desired $CrO_4^{--}$ ion concentration are $SrCrO_4$ and $BaCrO_4$. Even with these compounds the concentration deviations from the optimum is at least of a 10 fold order of magnitude, above and below the optimum, and this leads either to too long a delay time or to poor shelf life.

Accordingly, it is an object of the invention to provide a system in which an optimum chromate ion concentration during loading and discharge is maintained.

This and other objects which will appear are achieved by providing an electrolyte which simultaneously contains barium, strontium, sulfate and chromate ions which ions are in equilibrium with the corresponding earth substances $BaCrO_4$, $BaSO_4$ and $SrSO_4$.

When $SrSO_4$ is added to the $BaCrO_4$ present in the electrolyte, the following equilibrium becomes established in a solution:

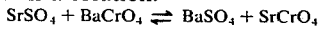
$SrSO_4 + BaCrO_4 \rightleftharpoons BaSO_4 + SrCrO_4$

Solubility products: $6\times10^{-7}\ 1.6\times10^{-10}\ 1\times10^{-10}\ 2\times10^{-5}$ In this equilibrium there is thus also formed in the presence of $SrSO_4$ and $BaCrO_4$, the low soluble $BaSO_4$, while $CrO_4^{--}$ ions go into solution in larger quantities because of the readier solubility of the $SrCrO_4$ than would be the case by using only the solubility products of $BaCrO_4$. Conversely, the same equilibrium is established in the presence of $SrCrO_4$ and $BaSO_4$, with formation of $BaCrO_4$ and $SrSO_4$, so that the initially high $CrO_4^{--}$ ion concentration is reduced. When $CrO_4^{--}$ ions are consumed, additional $CrO_4^{--}$ ions are resupplied from the earth substances in accordance with the above reaction. Thus a system is provided which is buffered with respect to $CrO_4^{--}$ ions.

Tables 1 and 2 which follow demonstrate this relationship.

TABLE 1

Concentration of $CrO_4^{--}$ ions in 26% $Mg(ClO_4)_2$ solution after 7 day standing period in the presence of various molar concentration of $BaCrO_4/SrSO_4$.

| Quantity in g/l 26% $Mg(ClO_4)_2$ solution | | $BaCrO_4/SrSO_4$ (Mol) | $CrO_4^{--}$ Concentration | |
|---|---|---|---|---|
| $BaCrO_4$ | $SrSO_4$ | | g/l | Mol/l |
| 50.67 | 7.35 | 0.2:1 | 0.140 | $1.21 \times 10^{-3}$ |
| 50.67 | 18.37 | 0.5:1 | 0.138 | $1.19 \times 10^{-3}$ |
| 50.67 | 33.07 | 0.9:1 | 0.138 | $1.19 \times 10^{-3}$ |
| 50.67 | 46.74 | 1:1 | 0.136 | $1.17 \times 10^{-3}$ |
| 50.67 | 40.41 | 1.1:1 | 0.138 | $1.19 \times 10^{-3}$ |
| 50.67 | 73.48 | 2:1 | 0.136 | $1.17 \times 10^{-3}$ |
| 50.67 | 183.70 | 5:1 | 0.158 | $1.36 \times 10^{-3}$ |

TABLE 2

Concentration of $CrO_4^{--}$ ions in 26% $Mg(ClO_4)_2$ solution after reaching equilibrium.

| Test No. | Quantity in g/l | Mol relationship BaCrO₄/SrSO₄ | CrO₄⁻⁻ion Concentr. (g/l) After 7 days wait | After 30 days wait |
|---|---|---|---|---|
| 2.1 BaCrO₄ | 50.67 | | 0.016 | 0.022 |
| 2.2 BaCrO₄ +SrSO₄ | 50.67 +36.74 | 1:1 | 0.136 | 0.156 |
| 2.6 SrCrO₄ | 50 | | 1.52 | 1.78 |

Analysis shows that, due to the presence of the SrSO₄-BaCrO₄ pairs, a CrO₄⁻⁻ ion concentration is maintained in the solution which approximates the concentration which is considered optimal for Mg-MnO₂ elements.

In order to confirm that the original CrO₄⁻⁻ ion eqilibrium concentration becomes reestablished through CrO₄⁻⁻ ion release, the major portion of electrolyte was decanted after performance of Test No. 2.2, and 500 milliliters of electrolyte without chromate ions were added to the remaining suspension. After standing for 7 days, the suspension was again analyzed for CrO₄⁻⁻ ion content and found to be 0.132 grams per liter.

The CrO₄⁻⁻ ion concentration provided by mixing equivalent quantities of SrSO₄ and BaCrO₄ (or of BaSO₄ and SrCrO₄) can, if desired, be modified in the desired direction by addition of SO₄⁻⁻ ions as follows:

Electrolyte: 26% Mg(ClO₄)₂ solution

| Test No. | Quantity in g/l | Mol relationship BaCrO₄/SrSO₄ | CrO₄⁻⁻ion concentr.(g/l) After 7 days wait | After 30 days wait |
|---|---|---|---|---|
| 3.3 BaCrO₄ +SrSO₄ +K₂SO₄ | 50.67 +36.74 + 5.0 | 1:1 | 0.24 | 0.26 |

Pursuant to equation (1), SO₄⁻⁻ ion addition leads to an equilibrium displacement in the direction of low-solubility BaSO₄, whereby the CrO₄⁻⁻ ion concentration rose due to the dissolution of BaCrO₄.

Preferably BaCrO₄ and SrSO₄ are utilized in equivalent quantities without additional SO₄⁻⁻ ions. Because an equilibrium is produced, it does not matter whether the initial substances used are those on the left or right side of equation (1).

For convenience of manufacture it is appropriate to provide the optimal chromate ion concentration with soluble chromates so that it is not necessary to wait for reaching of equilibrium from the low-solubility compounds, but the construction of the element can be begun with inhibitor protection.

It is not customary to add SO₄⁻⁻ ions to the electrolyte because this increases the magnesium corrosion. However, it has been ascertained that the sulfate concentration which is present in equilibrium in the above-mentioned low-solubility compounds has no adverse influence on corrosion.

The following non-limiting example further illustrates the invention.

EXAMPLE

To demonstrate the corrosive effect of electrolytes on a magnesium sheet of composition Al 2%, Zn 1%, Mn 0.15%, Ca 0.14% and the balance being of magnesium, a magnesium sheet (1 mm thick, 6.6 cm² surface area, about 1.2 gram weight) was placed into a sealed beaker containing 20 ml of the electrolyte. The electrolyte level was about 15 mm above the sheet. Storage time was one month. After etching in the CrO₃ bath and drying, it was weighed again.

| Electrolyte | Weight Loss | |
|---|---|---|
| A) 26% Mg(ClO₄)₂ solution without additives | 1.2 g | (Complete consumption) |
| B) 25% Mg(ClO₄)₂ solution + 0.02% Li₂CrO₄ | 0.033 g | |
| C) In 100 ml 26% Mg(ClO₄)₂– solution 5.067 g BaCrO₄ + 3.674 g SrSO₄ were suspended | 0.035 g | |
| D) In 100 ml 25% Mg(ClO₄)₂ solution + 0.02% Li₂CrO₄ 0.067 g BaCrO₄ + 3.674 g SrSO₄ were suspended | 0.028 g | |

The improvement obtained with the system of the invention is evident from the above data.

Below is an example of the manufacture of an element embodying the invention:

The mass of the positive electrode consists of:

| | |
|---|---|
| Synthetic manganese dioxide | 54.2% |
| Carbon black | 6.3% |
| Electrolyte (26% Mg(ClO₄)₂) with 0.02% Li₂CrO₄ | 36.8% |
| MgO | 0.7% |
| BaCrO₄ | 1.16% |
| SrSO₄ | 0.84% |
| H₂O | Balance |

These components are inserted into a round magnesium beaker after having been pressed into an ingot with appropriate spacing. A carbon rod (current take-off) is centrally inserted and the whole assembly tightly stoppered.

A similar battery is made with SrCrO₄ and BaSO₄.

The relationship of the BaCrO₄ and SrSO₄ in the mixture and the absolute quantities can both be varied depending on the conditions and use desired for the battery. However, a minimum concentration of both compounds is necessary as is explained below, in order to insure the presence of three earth substances BaCrO₄, SrSO₄ and BaSO₄. The minimum quantity to be provided of each of the two salt components is about 2 × 10⁻³ mol/kg. of solution. Any desired excess can be used, although the use of too large a quantity in the mass leads to a reduction of the active mass portion.

According to the laws of mass behavior, mixing of salts like barium and strontium perchlorate or magnesium sulfate is possible.

Below is an explanation of the buffer system for chromate ions in the range of $10^{-3}$ mole. In the simplest case this system consists of $BaCrO_4$ and $SrSO_4$, or of $BaSO_4$ and $SrCrO_4$.

Four low solubility compounds formed with the solubility products must be considered (see "Stability Constants of Metal-Ion Complexes" by Lars Gunnar Sillen, 2nd Edition, London, The Chemical Society, Burlington House W.I. 1964), which is incorporated herein by reference.

| | | | | |
|---|---|---|---|---|
| $L_{BaSO_4}$ | = | $(Ba^{2+})(SO_4^{2-})$ | = $1 \times 10^{-10}$ | (2) |
| $L_{BaCrO_4}$ | = | $(Ba^{2+})(CrO_4^{2-})$ | = $1.6 \times 10^{-10}$ | (3) |
| $L_{SrSO_4}$ | = | $(Sr^{2+})(SO_4^{2-})$ | = $6 \times 10^{-7}$ | (4) |
| $L_{SrCrO_4}$ | = | $(Sr^{2+})(CrO_4^{2-})$ | = $2 \times 10^{-5}$ | (5) |

For barium salts, equations (2) and (3) yield in equilibrium with the earth substances:

$$\frac{(CrO_4^{2-})}{(SO_4^{2-})} = \frac{L_{BaCrO_4}}{L_{BaSO_4}} = 1.6 \qquad (6)$$

and for the strontium salts, equations (4) and (5) yield:

$$\frac{(CrO_4^{2-})}{(SO_4^{2-})} = \frac{L_{SrCrO_4}}{L_{SrSO_4}} = 33.3 \qquad (7)$$

Only if equations (6) and (7) had yielded the same value could all four base substances be present concurrently in stable equilibrium. As it is, the solubility product of strontium chromate is too high; in the presence of the three other base substances, $SrCrO_4$ dissolves completely. On the other hand, in place of the constant solubility product for the strontium and chromate ions, a constant ion product is now obtained which is derived from equations (4) and (6) as shown below.

$$(Sr^{2+})(CrO_4^{2-}) = \frac{L_{BaCrO_4} \times L_{SrSO_4}}{L_{BaSO_4}} = 9.6 \times 10^{-7} \qquad (8)$$

For example, the chromate ion concentration will be reduced by the addition of $Sr(ClO_4)_2$. Application of equation (8) makes possible the practice of the invention.

In accordance with the invention, there are used salts mixtures which have an adequate quantity of barium, strontium, chromate and sulfate ions in order to form the three base substances $BaSO_4$, $BaCrO_4$ and $SrSO_4$. For this purpose, approximately a $2 \times 10^{-3}$ mol/kg solution is necessary; any desired excess is permissible through which the buffer capacity can be raised while the chromate concentration remains the same. According to equation (8) this mixture behaves like a low-solubility strontium chromate with reduced solubility product, which indeed is the fact. Therefore there results a chromate ion concentration of, for example:

$$(CrO_4^{2-}) = \sqrt{9.6 \times 10^{-7}} = 0.98 \times 10^{-3} \text{ mole} \qquad (9)$$

The analytically determined value of $1.17 \times 10^{-3}$ mole is slightly higher because, for purposes of calculation, thermodynamic solubility products are utilized, whereas, in practice, the activity coefficients in the presence of the high $Mg(ClO_4)_2$ concentration are less than 1, so that an ion product somewhat higher than that which is calculated can be expected.

This calculation demonstrates two notable advantages over the known buffer system of $BaCrO_4$ base substance:

A. The chromate concentration lies approximately in the optimal range; and

B. The buffer capacity exceeds that resulting from a $BaCrO_4$ buffer by the factor $$\frac{\sqrt{9.6 \times 10^{-7}}}{\sqrt{1.6 \times 10^{-10}}} = 77.5 \qquad (10)$$

up to the point where the chromate concentration is reduced by half.

Relative to the same end point of the chromate ion concentration $$(CrO_4^{2-}) = 0.65 \times 10^{-3} \text{ m} \qquad (11)$$

corresponding to half the starting concentration of the $BaCrO_4$ buffer, a buffer capacity results which is increased by the factor F $$F = \frac{\frac{9.6 \times 10^{-7}}{1.65 \times 10^{-3}} - \sqrt{9.6 \times 10^{-7}}}{\frac{1.6 \times 10^{-10}}{1.65 \times 10^{-5}} - \sqrt{1.6 \times 10^{-10}}} = 1.2 \times 10^{4} \qquad (12)$$

As is known in the prior art a galvanic primary element comprises, as its simplest elements, a magnesium anode, a carbon rod current take-off, a cathode mix of $MnO_2$, carbon black and/or graphite, an electrolyte consisting of salts of alkaline or alkali earths metals and containing one or more chromate inhibitors, and a separator between the anode and electrodes mix. In accordance with the invention the electrolyte comprises concurrently $Ba^{++}$-, $Sr^{++}$-, $SO_4^{--}$-, and $CrO_4^{--}$ ions in equilibrium with the corresponding earth substances of their salts, at least $BaCrO_4$, $BaSO_4$, and $SrSO_4$.

The battery of the invention combines excellent shelf life and reaches its operating potential without undue delay. For instance after 4 hours of an intermittend discharge with a current-density of about 10 mA per $cm^2$ of Mg-surface a delayed action time of 1.0 second was measured whereas conventional elements with unbuffered chromate inhibitor ($Li_2CrO_4$) under the same test-conditions had a delayed action time of more than 20 seconds.

All articles referred to herein are incorporated by reference.

We claim:

1. In a primary galvanic element comprising conventional components including a chromate inhibitor the electrolyte which comprises concurrently, as a chromate buffer system, barium, strontium, chromate and sulphate ions in equilibrium with solid phase barium chromate, barium sulphate and strontium sulphate.

2. A primary galvanic element according to claim 1 wherein the mass of the positive electrode contains the ingredients $BaCrO_4$ and $SrSO_4$.

3. A primary galvanic element according to claim 1 wherein the mass of the positive electrode contains the ingredients $BaSO_4$ and $SrCrO_4$.

4. The element of claim 1 wherein the total amount of chromate and sulfate is each at least $2 \times 10^{-3}$ mole per kilogram electrolyte.

5. In a primary galvanic element comprising conventional components including a chromate inhibitor the electrolyte which comprises the following salts: barium chromate, barium sulfate and strontium sulfate so that the electrolyte contains the four following ions: strontium, barium, chromate and sulfate in equilibrium with the undissolved salts.

6. In a primary galvanic element comprising conventional components including a chromate inhibitor the electrolyte which comprises the four ions strontium, barium, chromate and sulfate and the salts from which these ions are derived in equilibrium with said ions.

7. In the element of claim 1, an anode electrode of magnesium alloy.

* * * * *